(12) United States Patent
Chae et al.

(10) Patent No.: US 7,362,405 B2
(45) Date of Patent: Apr. 22, 2008

(54) METHOD OF FABRICATING LIQUID CRYSTAL DISPLAY DEVICE

(75) Inventors: Kyung-Su Chae, Gyeongsangbuk-Do (KR); Hyun-Ho Song, Gyeongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 8 days.

(21) Appl. No.: 11/407,948

(22) Filed: Apr. 21, 2006

(65) Prior Publication Data

US 2006/0187400 A1    Aug. 24, 2006

Related U.S. Application Data

(62) Division of application No. 10/674,552, filed on Oct. 1, 2003, now Pat. No. 7,098,988.

(30) Foreign Application Priority Data

Dec. 27, 2002  (KR) .................. 10-2002-0085624

(51) Int. Cl.
  *G02F 1/1339*  (2006.01)
(52) U.S. Cl. ...................... 349/156; 349/124
(58) Field of Classification Search ........... 349/156, 349/155, 123, 124
  See application file for complete search history.

(56) References Cited

U.S. PATENT DOCUMENTS

| | | | |
|---|---|---|---|
| 4,294,650 A | 10/1981 | Werthmann | |
| 5,259,926 A | 11/1993 | Kuwabara et al. | |
| 5,263,888 A * | 11/1993 | Ishihara et al. | 445/25 |
| 5,514,503 A | 5/1996 | Evans et al. | |
| 5,544,582 A | 8/1996 | Bocko et al. | |
| 5,678,483 A | 10/1997 | Johnson | |
| 5,701,815 A | 12/1997 | Bocko et al. | |
| 6,001,515 A | 12/1999 | Evans et al. | |
| 6,245,469 B1 * | 6/2001 | Shiba et al. | 430/7 |
| 6,356,318 B1 | 3/2002 | Kawahata | |
| 6,515,725 B1 * | 2/2003 | Hattori et al. | 349/123 |
| 6,867,840 B2 * | 3/2005 | Hsieh et al. | 349/187 |

FOREIGN PATENT DOCUMENTS

| | | |
|---|---|---|
| CN | 1153313 | 7/1997 |
| CN | 1321254 | 11/2001 |
| EP | 0471628 | 2/1992 |
| JP | 63-205608 | 8/1988 |
| JP | 3-280416 | 12/1991 |
| JP | 4-94115 | 3/1992 |
| JP | 4-239684 | 8/1992 |
| JP | 4-249189 | 9/1992 |
| JP | 4-296724 | 10/1992 |
| JP | 5-11270 | 1/1993 |

(Continued)

*Primary Examiner*—David Nelms
*Assistant Examiner*—David Y. Chung
(74) *Attorney, Agent, or Firm*—McKenna Long & Aldridge LLP

(57) ABSTRACT

A method of fabricating a liquid crystal display device includes providing a first substrate, forming an alignment layer on the first substrate using an ink jet method to form a plurality of holes that expose portions of the first substrate, and forming a spacer within each of the plurality of holes using the ink jet method.

9 Claims, 4 Drawing Sheets

FOREIGN PATENT DOCUMENTS

| | | |
|---|---|---|
| JP | 6-202314 | 7/1994 |
| JP | 7-240523 | 9/1995 |
| JP | 2001-083499 | 3/2001 |
| JP | 09-138410 | 5/2001 |
| KR | 1020020078517 | 10/2002 |

* cited by examiner

METHOD OF FABRICATING LIQUID CRYSTAL DISPLAY DEVICE

This application is a Divisional Application of U.S. patent application Ser. No. 10/674,552, filed on Oct. 1, 2003 now U.S. Pat. No. 7,098,988, now allowed, which claims priority to Korean Application No. 10-2002-85624, filed Dec. 27, 2002, all of which are hereby incorporated by reference as if fully set forth herein.

The present invention claims the benefit of Korean Patent Application No. 85624/2002 filed in Korea on Dec. 27, 2002, which is hereby incorporated by reference.

BACKGROUND OF THE INVENTION

1. Field of the Invention

The present invention relates to a method of fabricating a display device, and more particularly, to a method of fabricating a liquid crystal display device.

2. Description of the Related Art

As various portable electronic devices are developed, such as mobile phones, personal digital assistants (PDA), and notebook computers, requirements for small, light weight, and power-efficient flat panel display devices have gradually increased. Presently, liquid crystal display (LCD) devices, plasma display panel (PDP) devices, field emission display (FED) devices, and vacuum fluorescent display (VFD) devices have been developed for implementation as flat panel display devices. However, the LCD devices are currently being fabricated due to their simple mass production technology, easy driving systems, and production of high quality images.

FIG. 1 is a cross sectional view of a liquid crystal display device according to the present invention. In FIG. 1, an LCD device 1 comprises a lower substrate 5, which is a driving device substrate, an upper substrate 3, and a liquid crystal layer 7 formed between the lower and upper substrates 5 and 3. Although not shown, a plurality of pixels are formed on the lower substrate 5, a thin film transistor is formed at each one of the pixels, and pixel electrodes and common electrodes are formed on the lower and upper substrates 5 and 3, respectively. The upper substrate 3 is a color filter substrate that includes a color filter layer for producing colored light. In addition, an alignment layer is formed on the upper substrate 3 for orienting liquid crystal molecules of the liquid crystal layer 7.

The lower substrate 5 and the upper substrate 3 are attached by a sealing material 9, and the liquid crystal layer 7 is formed therebetween for driving the liquid crystal molecules using the driving devices formed on the lower substrate 5 in order to control light transmitted through the liquid crystal layer. Processes for fabricating the LCD device can be divided into a driving device array substrate process, wherein the driving devices are formed on the lower substrate 5; a color filter substrate process, wherein the color filters are formed on the upper substrate 3; and a cell process.

FIG. 2 is a flow chart of a method for fabricating a liquid crystal display device according to the related art. In FIG. 2, a step S101 includes forming a plurality of gate lines and a plurality of data lines on a lower substrate using a driving device array process for defining a plurality of pixel areas, and includes formation of thin film transistors, which are connected to the gate lines and the data lines, at the pixel areas. In addition, a pixel electrode, which is connected to the thin film transistor through the driving device array process, is formed for driving a liquid crystal layer as a signal is transmitted through the thin film transistor.

A step S104 includes formation of a color filter layer of R, G, and B colors and a common electrode on an upper substrate using a color filter process.

Steps S102 and S105 both include formation of alignment layers on the upper and lower substrates, wherein the alignment layers are rubbed in order to provide the liquid crystal molecules of the liquid crystal layer formed between the upper and lower substrates with an initial alignment and surface fixing force (i.e., pre-tilt angle and orientation direction).

Step S103 includes scattering a plurality of spacers onto the lower substrate for maintaining a uniform cell gap between the upper and lower substrates.

Step S106 includes formation of a sealing material along an outer portion of the upper substrate.

Step S107 includes attaching the upper and lower substrates by compressing the upper and lower substrates together.

Step S108 includes dividing the attached upper and lower substrates into a plurality of individual liquid crystal panels.

Step S109 includes injection of the liquid crystal material into the liquid crystal panels through a liquid crystal injection hole, wherein the liquid crystal injection hole is sealed to form the liquid crystal layer.

Step S110 includes testing the injected liquid crystal panel.

Operation of the LCD device makes use of an electro-optical effect of the liquid crystal material, wherein anisotropy of the liquid crystal material aligns liquid crystal molecules along a specific direction. Accordingly, control of the liquid crystal molecules significantly affects image stabilization of the LCD device. Thus, formation of the alignment layer and the spacers are critical for fabricating an LCD device that produces quality images.

However, during the spacer scattering process, the spacers are provided with the pixel area through which the light is to be transmitted. Accordingly, the spacers within the pixel area are similar to an impurity that interrupts orientation of liquid crystal molecules, thereby lowering aperture rate. Thus, a distribution density of the spacers should be controlled and uniformly maintained across a display screen of the LCD device. For example, although the distribution density of the spacers is high and a uniform cell gap may be maintained, displaying functions of a black screen is lowered by light dispersal due to the spacers, and a contrast ratio is reduced.

In order to solve the above problem, patterned column spacers are formed at desired locations by photolithographic processes of depositing (coating), developing, and etching organic polymer material. In addition, a mask process must be added in order to form the column spacers, thereby increasing fabrication costs and complicating the overall fabricating processes. However, formation of the spacers using the scattering method is performed after formation of the alignment layers, whereas using the patterned column spacers means that the formation of the alignment layers is performed after formation of the patterned column spacers. For example, the alignment layer process commonly uses a roller coating method.

FIG. 3 is a schematic view of a method for forming an alignment layer using a roller coating method according to the related art. In FIG. 3, an alignment material 21 is uniformly supplied between an anylox roll 22 and a doctor roll 23 of cylindrical shape as the anylox roll 22 and the doctor roll 23 rotate. The alignment material 21 is provided using a dispenser 1 having an injector shape. Then the alignment material 21 formed on a surface of the anylox roll 22 is transferred onto a rubber plate 25 when the anylox roll 22 rotates to contact a printing roll 24 upon which the rubber plate 25 is attached. The rubber plate 25 is aligned with a substrate 26 upon which the alignment material 21 will be applied. As a printing table 27, upon which the substrate 26 is loaded, is moved to contact the printing roll 24, the alignment material 21 is transferred onto the rubber plate 25 and is re-transferred onto the substrate 26 to form an alignment layer (not shown). Since a thickness of the alignment layer is about 500-1000 Å, thickness differences of 100 Å of the alignment layer may generate a blot on the screen of the LCD device. Accordingly, uniform thickness of the alignment layer is critical to display quality images on the screen of the LCD device.

However, since the dispenser 1 supplies the alignment material 21 onto the anylox roll 22 using a left-to-right motion along an upper part of the anylox roll 22, uniform thickness of the resulting alignment layer may not be achieved. For example, as a size of the substrate 26 increases, it becomes increasingly more difficult to form the alignment layer having a uniform thickness. Moreover, since all of the alignment material 21 transferred on the rubber plate 25 is not necessarily re-transferred onto the substrate 26, a significant amount of the alignment material 21 is wasted as compared to the amount of alignment material 21 that is re-transferred onto the substrate 26. Accordingly, the amount of wasted alignment material 21 unnecessarily increases production costs.

SUMMARY OF THE INVENTION

Accordingly, the present invention is directed to a method of fabricating a liquid crystal display device that substantially obviates one or more of the problems due to limitations and disadvantages of the related art.

An object of the present invention is to provide a method of fabricating a liquid crystal display having a uniform alignment layer across an entire surface of a substrate and to reduce material waste.

Another object of the present invention is to provide a method of fabricating a liquid crystal display having a simplified spacer formation process and to form the spacers at precise desired locations.

Additional features and advantages of the invention will be set forth in the description which follows, and in part will be apparent from the description, or may be learned by practice of the invention. The objectives and other advantages of the invention will be realized and attained by the method particularly pointed out in the written description and claims hereof as well as the appended drawings.

To achieve these and other advantages and in accordance with the purpose of the present invention, as embodied and broadly described, a method of fabricating a liquid crystal display device includes providing a first substrate, forming an alignment layer on the first substrate using an ink jet method to form a plurality of holes that expose portions of the first substrate, and forming a spacer within each of the plurality of holes using the ink jet method.

In another aspect, a method of fabricating a liquid crystal display device includes providing a lower substrate upon which a thin film transistor is formed and an upper substrate upon which a color filter is formed, forming an alignment layer on one of the lower substrate and the upper substrate using an ink jet method, and forming a plurality of spacers on one of the lower substrate and upper substrate.

In another aspect, a method of fabricating a liquid crystal display device includes providing a lower substrate upon which a thin film transistor is formed and an upper substrate upon which a color filter is formed, applying a first alignment layer along an entire surface of the lower substrate using an ink jet method, applying a second alignment layer along a surface of the upper substrate using the ink jet method, the second alignment layer having a plurality of holes that expose surface portions of the upper substrate, and forming a spacer in each of the plurality of holes formed on the expose surface portions of the upper substrate using the ink jet method.

In another aspect, a method of fabricating a liquid crystal display device includes providing a first substrate and a second substrate, dispensing a first alignment material on first surface portions of the first substrate to expose second surface portions of the first substrate, and dispensing the first alignment material on second surface portions of the second substrate to expose second surface portions of the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
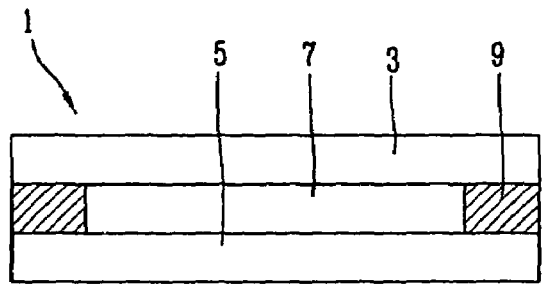
FIG. 1 is a cross sectional view of a liquid crystal display device according to the present invention.
Figure 2:
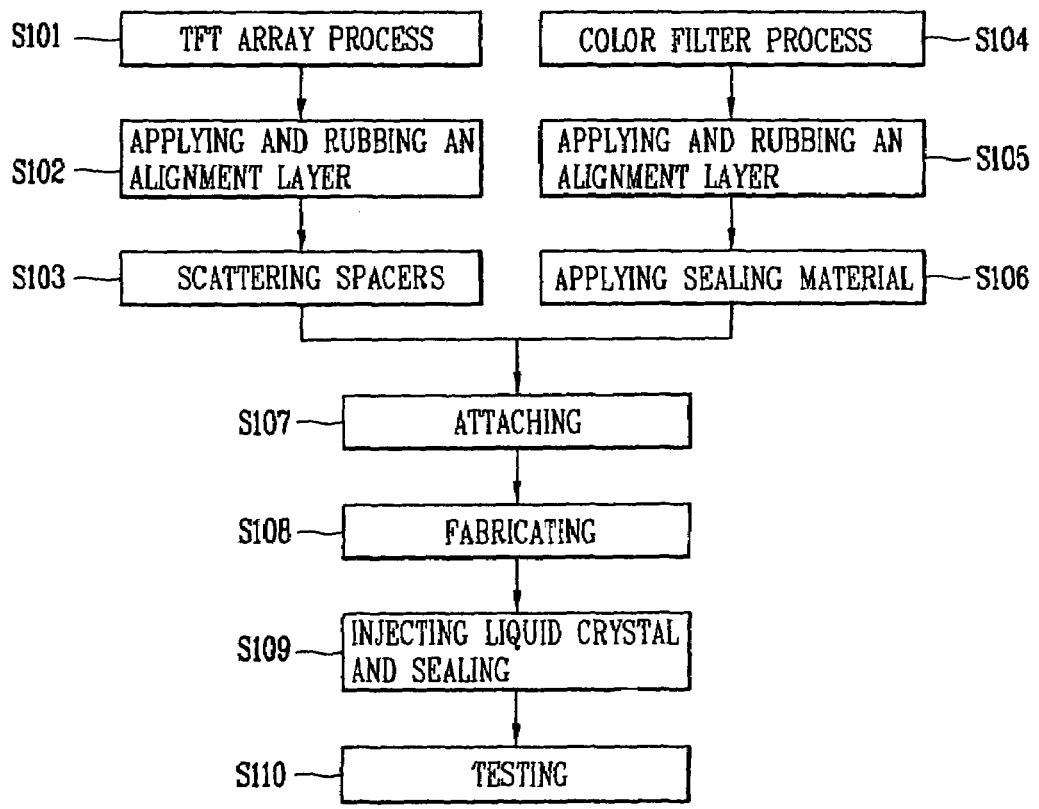
FIG. 2 is a flow chart of a method for fabricating a liquid crystal display device according to the related art.
Figure 3:
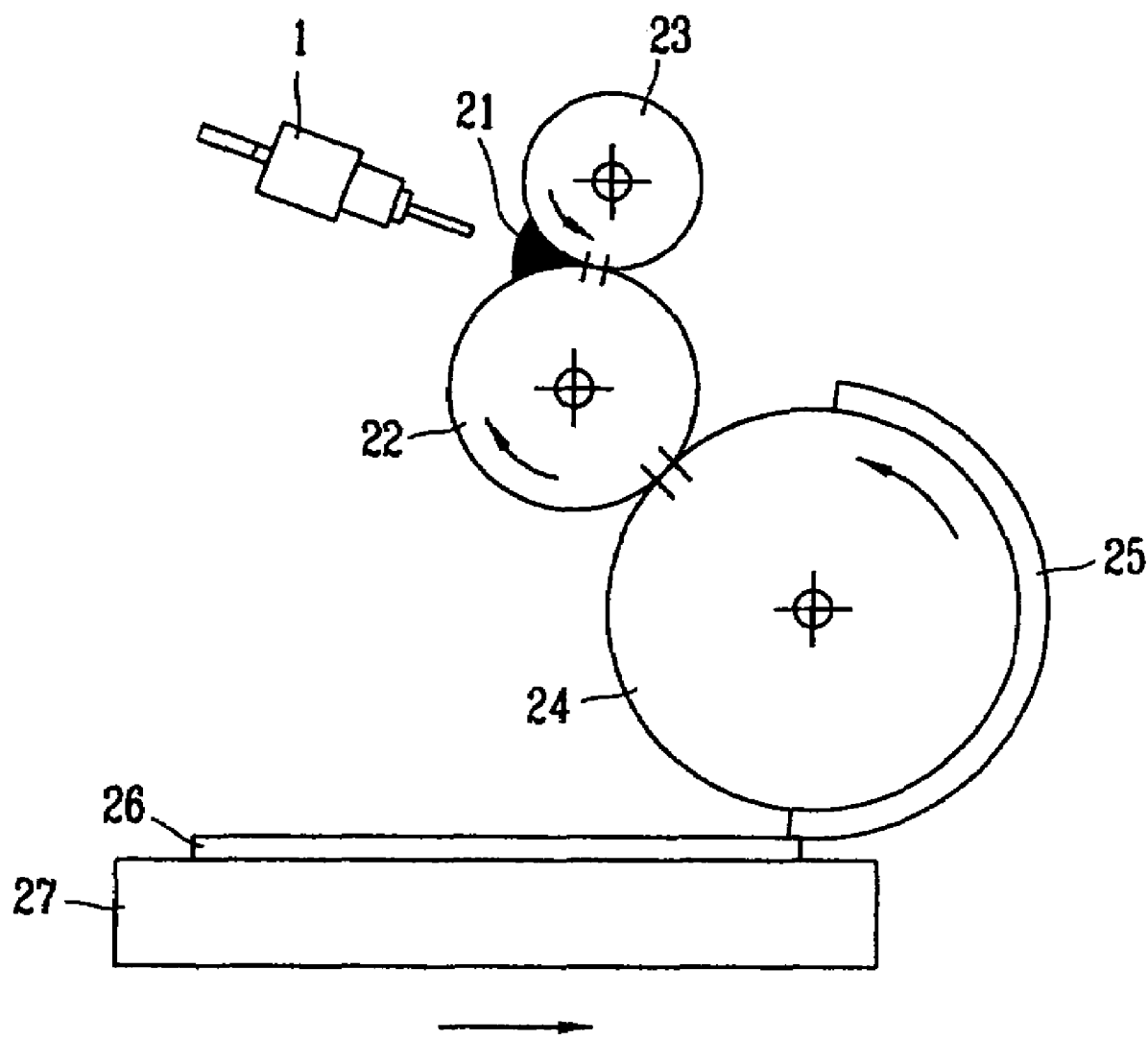
FIG. 3 is a schematic view of a method for forming an alignment layer using a roller coating method according to the related art.
Figure 4A:
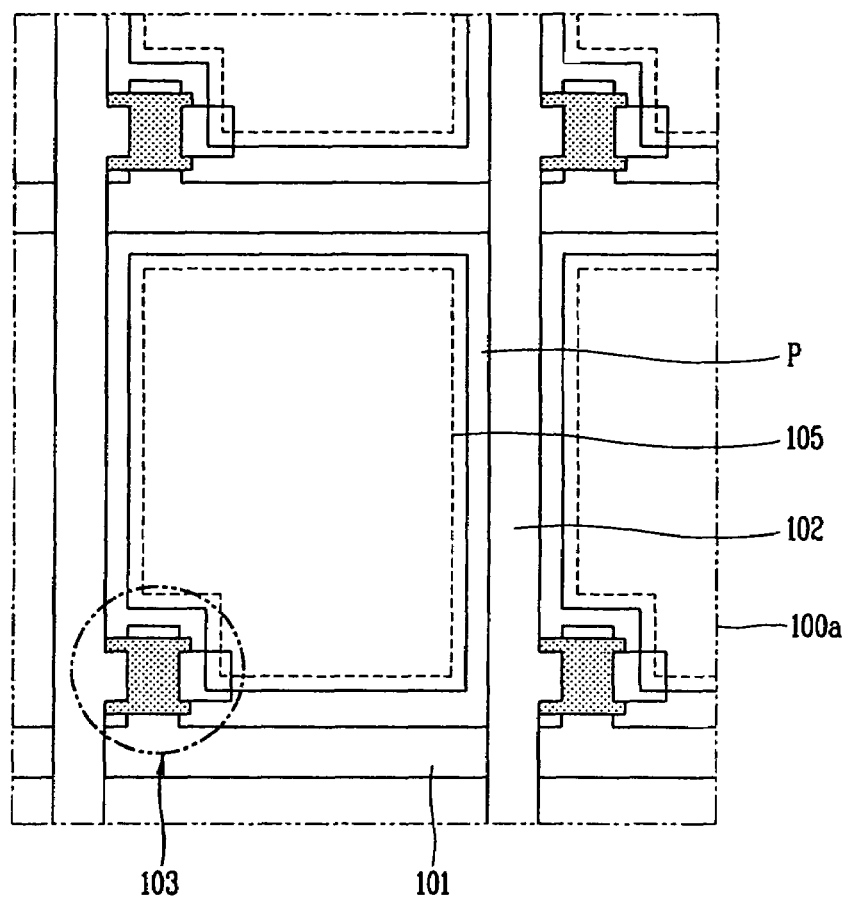
FIG. 4A is a plan view of an exemplary first substrate fabricated using an exemplary thin film transistor array process according to the present invention.
Figure 4B:
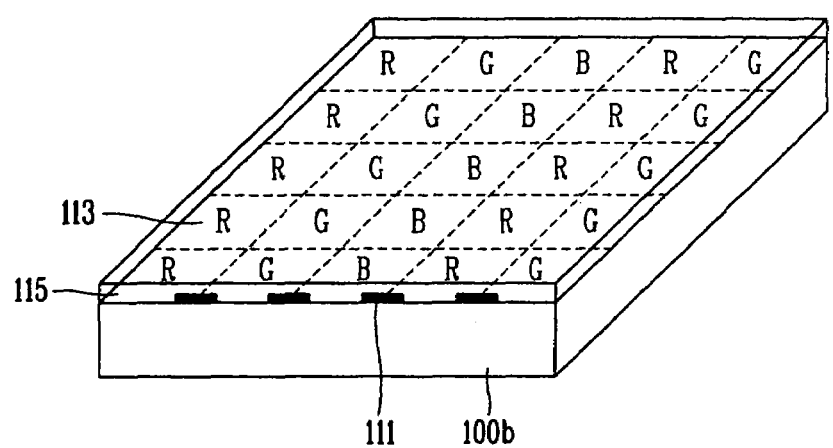
FIG. 4B is a perspective view of an exemplary second substrate fabricated using an exemplary color filter process according to the present invention.
Figure 4C:
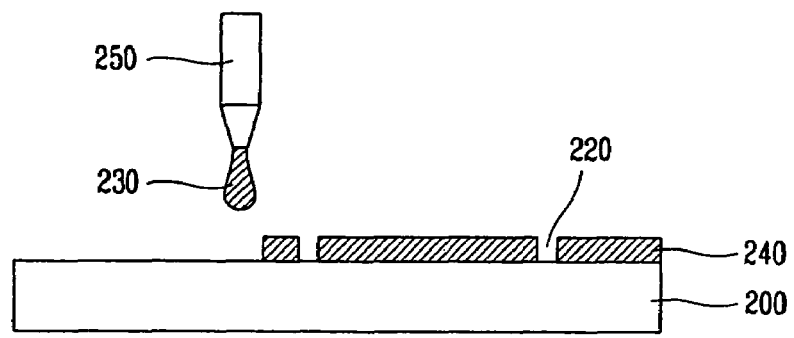
FIG. 4C is a schematic cross sectional view of an exemplary method for forming an alignment layer according to the present invention.
Figure 4D:
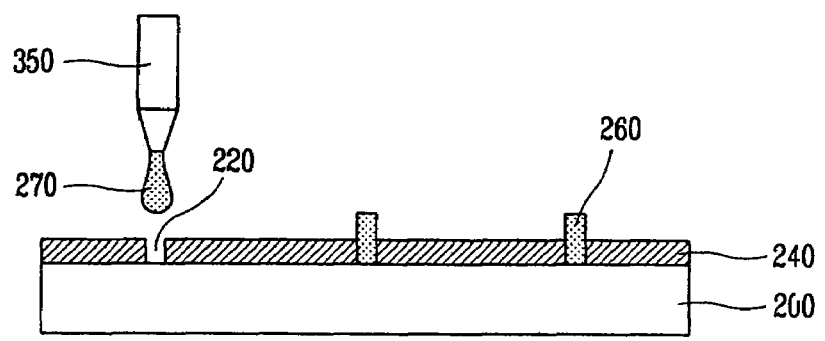
FIG. 4D is a schematic cross sectional view of an exemplary method for forming spacers according to the present invention.
Figure 5:
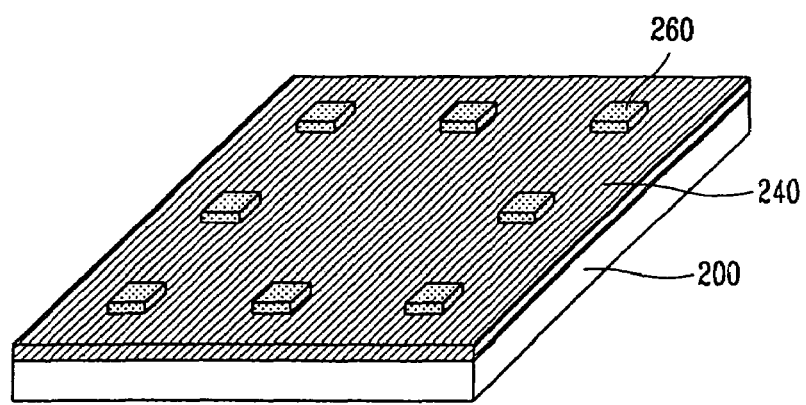
FIG. 5 is a perspective view of the alignment layer and spacers formed on a substrate using the methods FIGS. 4C and 4D according to the present invention.

FIG. 4A is a plan view of an exemplary first substrate fabricated using an exemplary thin film transistor array process according to the present invention, FIG. 4B is a perspective view of an exemplary second substrate fabricated using an exemplary color filter process according to the present invention, FIG. 4C is a schematic cross sectional view of an exemplary method for forming an alignment layer according to the present invention, and FIG. 4D is a schematic cross sectional view of an exemplary method for forming spacers according to the present invention. In FIG. 4A, during a thin film transistor array process, a plurality of gate lines 101 and data lines 102 may be arranged along transverse and longitudinal directions on a first substrate 100a, thereby defining pixel areas "P" each having a thin film transistor 103 connected to the gate line 101 and the data line 102. Then, a passivation layer (not shown) may be formed along an entire area of the thin film transistor 103 and the pixel area "P," and a transparent pixel electrode 105 may be formed on the passivation layer.

In FIG. 4B, during a color filter process, a black matrix 111 may be formed on a second substrate 100b, a color filter 113 may be formed within an area that corresponds to the pixel areas "P" of the first substrate 100a (in FIG. 4A), and a common electrode 115 may be formed on the color filter 113.

In FIG. 4C, alignment layers may be formed on a substrate 200, which may be one of the first and second substrates 100a and 100b (in FIGS. 4A and 4B) using an ink jet method. The ink jet method may include supplying an alignment material 230 onto a substrate 200, such as one, or both of the first and second substrates 100a and 100b (in FIGS. 4A and 4B), using an ink jet system 250. The alignment material 230 supplied from the ink jet system 250 may form an alignment layer 240 on the substrate 200. Although not shown, the ink jet system 250 may include a nozzle for supplying the alignment material 230 onto the substrate 200 and an alignment material supplying unit for supplying the alignment material 230 into the nozzle. In addition, a plurality of holes may be formed on the nozzle, wherein supplied amounts of the alignment material 230 may be controlled by opening and closing of the holes. Moreover, processing time for forming the alignment layer 240 may be controlled by controlling total numbers of the nozzle.

Formation of the alignment layer 240 may be accomplished by moving the nozzle along an entire upper portion of the substrate 200, wherein the alignment layer 240 may be formed having a uniform thickness across an entire surface of the substrate 200. Accordingly, the alignment layer 240 may be formed on the substrate 200 by selectively closing/opening some of the holes formed in the nozzle as the nozzle passes along the substrate 200 as the alignment material 230 is supplied.

In FIG. 4C, the alignment layer 240 may be formed to have a patterned shape including holes 220 through which some portions of the substrate 200 may be exposed. Accordingly, the holes 220 may be formed at areas where spacers may be subsequently formed, i.e., gate line areas and data line areas. Thus, the alignment layer 240 may be formed on one of the first and second substrates. In addition, the alignment layer 240 may be rubbed to provide an initial orientation alignment of liquid crystal molecules of a subsequently provided liquid crystal material layer.

In FIG. 4D, spacers 260 may be formed in the holes 220 of the alignment layer 240 after the rubbing of the alignment layer 240. Although the spacers 260 may be formed on one of the first and second substrates 100a and 100b (in FIGS. 4A and 4B), the spacers 260 may be formed on the substrate 200 upon which the alignment layer 240 is formed. Accordingly, the spacers 260 may be formed using the same ink jet method used to form the alignment layer 240.

During formation of the spacers 260 using the ink jet method, the nozzle (not shown) of the ink jet system 350 may pass along the areas where the alignment layer 240 is formed, and may selectively drop organic material 270 (i.e., photoresist material) into the holes 220 formed in the alignment layer 240. Then, the organic material 270 may be hardened to form the spacers 260 each having a predetermined height. In addition, the organic material 270 may be injected with a solvent to control viscosity of the organic material 270. Accordingly, amounts of the injected organic material 270 may be selected based upon evaporation amounts of the solvent. Thus, the holes 220 formed in the alignment layer 240 may function to maintain shapes of spacers 260 in order to prevent spreading of the organic material 270 dropped into the holes 220. For example, the spacers 260 may have a certain height (i.e., 3 μm or more) in order to maintain a uniform cell gap between the first and second substrates 100a and 100b (in FIGS. 4A and 4B) when attached together.

However, it may be difficult to form the spacers 260 using the organic material 270 without using barrier ribs (not shown) due to physical properties of the organic material 270. Thus, the holes 220 that expose the portions of the substrate 200 may be formed in advance at positions where the spacers 260 will be formed to function as the barrier ribs. Accordingly, the holes 220 formed in the alignment layer 240 may be formed to have specific shapes if the holes 220 are to maintain the height of the organic material 270 and are not to interrupt injection of the liquid crystal material. For example, barrier ribs for forming the spacers 260 may not have to be formed on the alignment layer 240. However, it may be desirable that the holes 220 may be formed in advance when the alignment layer 240 is formed since an additional mask process is necessary for forming the barrier ribs.

When the spacers 260 have been completed, the liquid crystal material may be dispensed onto liquid crystal panel areas of the first substrate 100a (in FIG. 4A) upon which the thin film transistors may have been formed, and the sealing material may be applied along outer portions of the liquid crystal panel on the second substrate 100b (in FIG. 4B). Then, the first and second substrates 100a and 100b (in FIGS. 4A and 4B) may be attached together by the sealing material. Next, the attached first and second substrates may be divided into a plurality of individual liquid crystal panels using a cutting process.

Although the liquid crystal material may be dropped onto either one of the first and second substrates 100a and 100b (in FIGS. 4A and 4B), the substrate upon which the liquid crystal material is dispensed should be provided as a lower one of the attached first and second substrates. Alternatively, the liquid crystal material may be injected into the plurality of individual liquid crystal panels after the cutting process, but it is desirable that the liquid crystal dispensing method be used since injection of the liquid crystal material has a relatively long processing time and results in significant amounts of wasted liquid crystal material. Accordingly, during the liquid crystal dispensing method, since the liquid crystal material is directly dispensed onto the substrate in a relatively short period of time, formation of the liquid crystal material layer in large-sized LCD devices may proceed very rapidly. In addition, since only required amounts of the liquid crystal material is dispensed onto the substrate, waste amounts of the liquid crystal material may be, significantly reduced. Thus, fabrication costs of the LCD device may be greatly reduced.

It will be apparent to those skilled in the art that various modifications and variations can be made in the method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   providing a first substrate;
   forming an alignment layer on the first substrate using an ink jet method to form a plurality of holes that expose portions of the first substrate; and
   forming a spacer within each of the plurality of holes using the ink jet method;
   forming gate lines and data lines arranged along transverse and longitudinal directions on a transparent substrate to define a plurality of pixel areas;
   forming a thin film transistor at crossing points of the gate and data lines;
   forming a passivation layer along an entire surface of the transparent substrate including the thin film transistor; and
   forming a pixel electrode within each of the pixel areas.

2. The method of claim 1, wherein the step of providing a first substrate comprises:
   forming a black matrix on a transparent substrate;
   forming a color filter on the black matrix; and
   forming a common electrode on the color filter.

3. The method of according to claim 1, wherein the spacers include an organic material.

4. The method according to claim 3, wherein the organic material includes a photoresist material.

5. The method of according to the claim 1, further comprising a step of dispensing liquid crystal material onto the first substrate.

6. A method of fabricating a liquid crystal display device, comprising:
   providing a lower substrate upon which a thin film transistor is formed and an upper substrate upon which a color filter is formed;
   forming an alignment layer on one of the lower substrate and the upper substrate using an ink jet method, wherein the alignment layer includes a plurality of holes exposing portions of the substrate; and
   dispensing a spacer material at the holes in one of the lower substrate and the upper substrate to form a plurality of spacers at the holes.

7. The method according to claim 6, further comprising:
   applying a sealing material on the upper substrate; and
   dispensing liquid crystal material onto the lower substrate.

8. A method of fabricating a liquid crystal display device, comprising:
   providing a first substrate and a second substrate;
   dispensing a first alignment material on first surface portions of the first substrate to expose portions of the first substrate;
   dispensing the first alignment material on second surface portions of the second substrate to expose portions of the first substrate; and
   forming a spacer within each of the plurality of holes in at least one substrate of first and second substrates using the ink jet method.

9. The method according to claim 8, wherein the first substrate is a color filter substrate and the second substrate is a thin film transistor substrate.

* * * * *